US011808625B2

United States Patent
Zhong (10) Patent No.: US 11,808,625 B2
(45) Date of Patent: Nov. 7, 2023

(54) AMBIENT LIGHT SENSOR AND ELECTRONIC DEVICE WHEREIN A DETECTED SIGNAL AMOUNT OF INFRARED LIGHT IN THE AMBIENT LIGHT IS CONFIGURED TO CORRECT A PIXEL VALUE OF A PIXEL UNIT CORRESPONDING TO A COLOR LIGHT FILTERING UNIT

(71) Applicant: SHENZHEN GOODIX TECHNOLOGY CO., LTD., Guangdong (CN)

(72) Inventor: Songjin Zhong, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/847,391

(22) Filed: Jun. 23, 2022

(65) Prior Publication Data
US 2023/0204412 A1    Jun. 29, 2023

Related U.S. Application Data

(63) Continuation of application No. PCT/CN2021/141792, filed on Dec. 27, 2021.

(51) Int. Cl.
*G02B 5/20* (2006.01)
*G01J 1/42* (2006.01)
(Continued)

(52) U.S. Cl.
CPC ............ *G01J 1/4204* (2013.01); *G01J 1/0271* (2013.01); *G01J 1/0492* (2013.01)

(58) Field of Classification Search
CPC .......... G02B 5/20; H04N 25/13; H04N 25/17; H04N 25/11; G01J 1/42; G01J 1/04
(Continued)

(56) References Cited

U.S. PATENT DOCUMENTS 8,274,051 B1    9/2012 Aswell et al.
10,553,179 B2 *  2/2020 Holenarsipur ........... H04N 5/33
(Continued)

FOREIGN PATENT DOCUMENTS

CN    101577287 A    11/2009
CN    102095495 A    6/2011
(Continued)

*Primary Examiner* — Que Tan Le
(74) *Attorney, Agent, or Firm* — Scully, Scott, Murphy & Presser, P.C.

(57) ABSTRACT

The present application provides an ambient light sensor and an electronic device, which may improve detection accuracy and detection performance of the ambient light sensor. The ambient light sensor includes: a light filtering unit array including a plurality of light filtering units, the plurality of light filtering units including a color light filtering unit, a white light filtering unit and a transparent light filtering unit, the white light filtering unit being configured to pass a visible light signal and block an infrared light signal, and the transparent light filtering unit being configured to pass the visible light signal and the infrared light signal; a pixel unit array including a plurality of pixel units, the plurality of pixel units being configured to receive a light signal after the ambient light passes through the plurality of light filtering units for an ambient light detection.

19 Claims, 6 Drawing Sheets

(51) Int. Cl.
*G01J 1/02* (2006.01)
*G01J 1/04* (2006.01)

(58) Field of Classification Search
USPC ............... 250/214 AB, 214 R, 239, 226
See application file for complete search history.

(56) References Cited

U.S. PATENT DOCUMENTS

| | | |
|---|---|---|
| 2011/0068255 A1 | 3/2011 | Zheng et al. |
| 2011/0068426 A1 | 3/2011 | Zheng et al. |
| 2012/0312990 A1 | 12/2012 | Aswell et al. |
| 2014/0168761 A1 | 6/2014 | Ockenfuss |
| 2015/0219492 A1 | 8/2015 | Glover et al. |
| 2015/0221691 A1 | 8/2015 | Watanabe |
| 2016/0013355 A1 | 1/2016 | Minixhofer |
| 2017/0068025 A1 | 3/2017 | Ockenfuss |
| 2017/0328767 A1 | 11/2017 | Zheng |
| 2018/0003556 A1 | 1/2018 | Uedaira |
| 2021/0311231 A1 | 10/2021 | Uedaira |

FOREIGN PATENT DOCUMENTS

| | | |
|---|---|---|
| CN | 102623467 A | 8/2012 |
| CN | 105430359 A | 3/2016 |
| CN | 109738060 A | 5/2019 |
| CN | 111133446 A | 5/2020 |
| CN | 111968600 A | 11/2020 |
| CN | 112951862 A | 6/2021 |
| CN | 215187066 U | 12/2021 |
| EP | 2700920 A1 | 2/2014 |
| JP | 2018093284 A | 6/2018 |
| TW | M498898 U | 4/2015 |

* cited by examiner

AMBIENT LIGHT SENSOR AND ELECTRONIC DEVICE WHEREIN A DETECTED SIGNAL AMOUNT OF INFRARED LIGHT IN THE AMBIENT LIGHT IS CONFIGURED TO CORRECT A PIXEL VALUE OF A PIXEL UNIT CORRESPONDING TO A COLOR LIGHT FILTERING UNIT

CROSS-REFERENCE TO RELATED APPLICATIONS

This application is a continuation of International Application No. PCT/CN2021/141792, filed on Dec. 27, 2021, the disclosure of which is hereby incorporated by reference in its entirety.

TECHNICAL FIELD

The present application relates to the field of sensors, and in particular, to an ambient light sensor and an electronic device.

BACKGROUND

With the development of electronic devices (for example, smart terminal devices: mobile phones, tablet computers, etc.), an ambient light sensor has gradually become a standard sensor. The ambient light sensor is used to detect an intensity of an ambient light in an environment where a smart terminal device is located. The detected intensity of the ambient light may be used for various purposes, for example, a screen brightness of a terminal device may be automatically adjusted according to the intensity of the ambient light, so as to improve a user's experience of using the terminal device.

In view of a wide use of the ambient light sensor in the electronic device, how to improve detection accuracy and detection performance of the ambient light sensor, thereby improving the user's experience of using the electronic device where the ambient light sensor is located, is a technical problem to be solved urgently.

SUMMARY

The present application provides an ambient light sensor and an electronic device, which may improve detection accuracy and detection performance of the ambient light sensor, thereby improving a user's experience of using the electronic device where the ambient light sensor is located.

In a first aspect, an ambient light sensor is provided, including: a light filtering unit array including a plurality of light filtering units, the plurality of light filtering units including a color light filtering unit, a white light filtering unit and a transparent light filtering unit, the white light filtering unit being configured to pass a visible light signal and block an infrared light signal, and the transparent light filtering unit being configured to pass the visible light signal and the infrared light signal; a pixel unit array located under the light filtering unit array, the pixel unit array including a plurality of pixel units, the plurality of pixel units being configured to receive a light signal after an ambient light passes through the plurality of light filtering units for an ambient light detection.

Through the technical solution of embodiments of the present application, the white light filtering unit and the transparent light filtering unit are provided in the ambient light sensor at the same time, and according to pixel units corresponding to the white light filtering unit and the transparent light filtering unit, a signal amount of the infrared light signal in the ambient light may be detected and obtained. According to the signal amount of the infrared light signal, a detection result of the ambient light sensor may be corrected or optimized, thereby improving the detection accuracy and detection performance of the ambient light sensor.

In some possible implementation manners, in the plurality of light filtering units, the number of color light filtering units is greater than or equal to the number of white light filtering units, and/or, the number of color light filtering units is greater than the number of transparent light filtering units.

In some possible implementation manners, in the plurality of light filtering units, a ratio of the number of white light filtering units to the number of the plurality of light filtering units is less than or equal to 20%, and/or, a ratio of the number of white light filtering units to the number of the plurality of light filtering units is greater than or equal to 5%.

In some possible implementation manners, in the plurality of light filtering units, a ratio of the number of transparent light filtering units to the number of the plurality of light filtering units is less than or equal to 9%, and/or, a ratio of the number of transparent light filtering units to the number of the plurality of light filtering units is greater than or equal to 4%.

In some possible implementation manners, the white light filtering unit and/or the transparent light filtering unit are located in an edge area of the light filtering unit array.

In some possible implementation manners, in the plurality of light filtering units, the color light filtering unit includes: a blue light filtering unit and a red light filtering unit; and a ratio of the number of blue light filtering units to the number of the plurality of light filtering units is less than or equal to 24%; and/or, a ratio of the number of red light filtering units to the number of the plurality of light filtering units is greater than or equal to 15%.

In some possible implementation manners, a ratio of pixel values of pixel units corresponding to the blue light filtering unit and the red light filtering unit is configured to detect color temperature of the ambient light.

In some possible implementation manners, in the plurality of light filtering units, the color light filtering unit includes: a green light filtering unit, and a ratio of the number of green light filtering units to the number of the plurality of light filtering units is greater than or equal to 24%.

In some possible implementation manners, a pixel value of a pixel unit corresponding to the green light filtering unit is configured to detect illuminance of the ambient light.

In some possible implementation manners, the plurality of light filtering units are arranged in N row(s), and each row of the light filtering units of the N row(s) of the light filtering units includes: the red light filtering unit, the green light filtering unit and the blue light filtering unit, and where N is a positive integer.

In some possible implementation manners, each row of the light filtering units of the N row(s) of the light filtering units further include the white light filtering unit.

In some possible implementation manners, the plurality of light filtering units are arranged in M column(s), and each column of the light filtering units of the M column(s) of the light filtering units includes: the red light filtering unit, the green light filtering unit and the blue light filtering unit, and where M is a positive integer.

In some possible implementation manners, each column of the light filtering units of the M column(s) of the light filtering units further include the white light filtering unit.

In some possible implementation manners, the light filtering unit array further includes: a light blocking unit configured to block and absorb the light signal; and a pixel unit in the pixel unit array corresponding to the light blocking unit being configured to detect a noise floor of the ambient light sensor.

In some possible implementation manners, the plurality of light filtering units are arranged in the N row(s), an end portion of each row of the N row(s) of the light filtering units is provided with one light blocking unit, and where N is a positive integer.

In some possible implementation manners, a gap is formed between two adjacent light filtering units in the light filtering unit array, and a width of the gap is greater than 20 μm.

In some possible implementation manners, in the light filtering unit array, each light filtering unit corresponds to P×P pixel units in the pixel unit array, and where P is a positive integer greater than or equal to 5.

In some possible implementation manners, the ambient light sensor is capable of being configured to be provided under a display screen of an electronic device, and the ambient light sensor is configured to receive the ambient light after passing through the display screen for the ambient light detection.

In some possible implementation manners, a pixel unit corresponding to the white light filtering unit and a pixel unit corresponding to the transparent light filtering unit are configured to jointly detect a signal amount of the infrared light signal in the ambient light, and the signal amount of the infrared light signal is configured to correct a pixel value of a pixel unit corresponding to the color light filtering unit.

In some possible implementation manners, the color light filtering unit includes one or more of the blue light filtering unit, the red light filtering unit and the green light filtering unit, the signal amount of the infrared light signal is configured to correct a pixel value of a pixel unit corresponding to one or more of the blue light filtering unit, the red light filtering unit and the green light filtering unit.

In some possible implementation manners, a pixel unit corresponding to the white light filtering and a pixel unit corresponding to the transparent light filtering unit are configured to jointly detect the signal amount of the infrared light signal in the ambient light, and the signal amount of the infrared signal is configured to determine a light source type corresponding to the ambient light.

In a second aspect, an electronic device is provided, including: a display screen and the ambient light sensor provided in the first aspect or any one of possible implementation manners in the first aspect, where sensing data detected by the ambient light sensor is configured to adjust an optical parameter of the display screen.

In some possible implementation manners, the ambient light sensor is provided under a display area of the display screen.

Through the technical solution of the embodiments of the present application, the ambient light sensor is provided in the electronic device. Since the ambient light sensor has the high detection accuracy and detection performance, the optical parameter of the display screen is adjusted according to the sensing data of the ambient light sensor, which may make adjustment of the display screen more accurate to adapt to the current ambient light, so as to be capable of improving the user's experience of using the electronic device.

DESCRIPTION OF EMBODIMENTS

To make objectives, technical solution and advantages of embodiments of the present application clearer, the following clearly describes the technical solution in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

The related technical solution of an ambient light sensor (ALS) provided in the embodiments of the present application may be applied to various electronic devices, and is especially suitable for three types of related 3C electronic products, including computers and their peripherals, communications, and consumer electronics, such as smart phones, notebook computers, tablet computers, smart wearable devices, home appliances, game devices, etc. In addition, the technical solution involved in the embodiments of the present application further involves other types of the electronic devices such as automotive electronics, which is not specifically limited in the embodiments of the present application.

As an application scenario, an ambient light sensor provided in the embodiments of the present application may be applied to smart phones, tablet computers and other mobile terminals having display screens or other terminal devices. For example, in some implementation manners, the ambient light sensor may be provided between a middle frame and a display screen of an electronic device, and is located under a cover glass (CG) of the electronic device, so as to implement an ambient light detection of an environment where the electronic device is located. Alternatively, in other implementation manners, the ambient light sensor may also be provided in a partial area under the display screen of the electronic device, thereby forming an under-display ambient light detection device.

Figure 1:
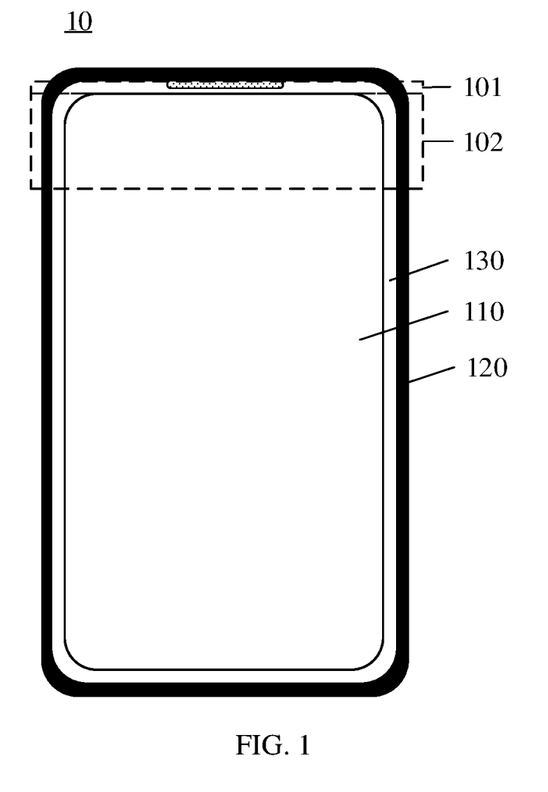
FIG. 1 is a schematic elevation view of an electronic device to which the present application is applicable.

FIG. 1 shows a schematic elevation view of an electronic device 10 to which the present application is applicable.

As shown in FIG. 1, the electronic device 10 includes a middle frame 120 and a display screen 110 with a gap area 130 between the display screen 110 and the middle frame 120. Among them, an area in which the display screen 110 is located shown in FIG. 1 is a display area of the display screen 110, and a cover plate may be provided in the gap area 130 to protect the display screen 110 and provide a touch interface for a user's finger 140.

Optionally, the display screen 110 may be a self-emitting display screen that adopts a self-emitting display unit as a display pixel. For example, the display screen 110 may be an organic light-emitting diode (OLED) display screen or a micro light-emitting diode (micro-LED) display screen. In other alternative embodiments, the display screen 110 may also be a liquid crystal display (LCD) screen or other passive light-emitting display screens, which is not limited in the embodiments of the present application.

In addition, the middle frame 120 shown in FIG. 1 may include an outer frame of the electronic device 10. In addition to the outer frame shown in FIG. 1, the middle frame 120 in the embodiments of the present application further includes a frame provided under the display screen 110 for carrying various components inside the electronic device, including but not limited to motherboards, batteries, cameras, cables, various sensors, microphones, earpieces and other components and parts.

Since an arrangement of larger components such as cameras, motherboards, speakers, and vibration motors shall be prioritized in an overall design of the electronic device, the ambient light sensor and other small sensors are generally provided in a first area 101 shown in FIG. 1. The first area 101 is a partial area located on an upper part of the electronic device in the above gap area 130. Alternatively, in other related technologies, the ambient light sensor is separately provided in the second area 102 shown in FIG. 1, and the second area 102 may be a display area on the upper part of the display screen 110.

Figure 2:
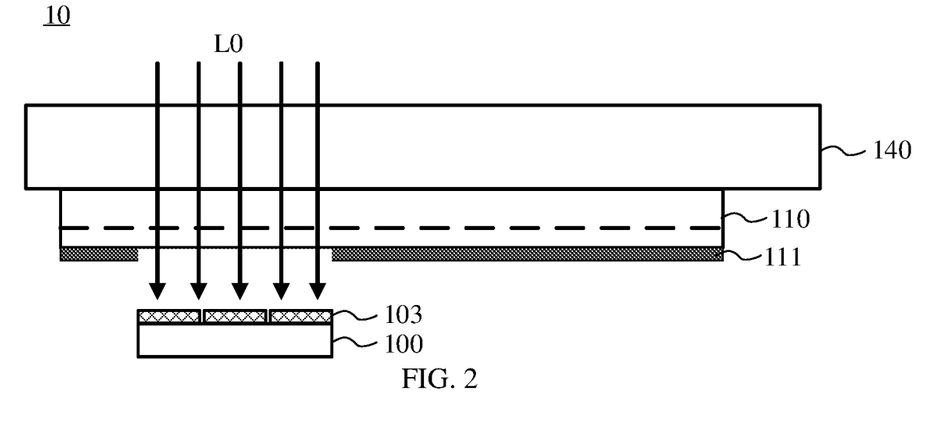
FIG. 2 is a cross-sectional schematic view of an ambient light sensor provided under a display screen provided by an embodiment of the present application.

FIG. 2 shows a cross-sectional schematic view of an ambient light sensor provided under a display screen 110.

As shown in FIG. 2, in the electronic device 10, an ambient light sensor 100 is provided under the display area of the display screen 110 for detecting an ambient light L0 after passing through the display screen 110.

Optionally, a cover plate 140 is provided on an upper surface of the display screen 110, and the cover plate 140 may be a transparent hard material such as glass or resin.

A protective layer 111 is provided on a lower surface of the display screen 110, the protective layer 111 is generally a rear panel of the display screen, and it may be a black sheet layer or printing layer for block a light, which includes at least part of a metal material for heat dissipation and may also include a foam layer to play a role of buffering and protection.

As shown in FIG. 2, a window is formed in the protective layer 111, the ambient light sensor 100 is provided under the window, and the ambient light L0 is transmitted to the ambient light sensor 100 through the cover plate 140, the display screen 110 and the window in the protective layer 111, so that the ambient light sensor 100 performs an ambient light detection based on the received ambient light L0.

In some related implementation manners, the ambient light sensor 100 is provided with a plurality of color filters (CF) 103 of different colors. The color filter 103 is provided above a photosensitive element of the ambient light sensor 100, so that the photosensitive element in the ambient light sensor 100 may receive color light signals of a plurality of colors, which is convenient for the ambient light sensor 100 to detect relevant optical parameters of the ambient light, thereby improving the detection performance of the ambient light sensor 100.

However, in this implementation manner, due to a limitation of a preparation process of the color filter 103 and other reasons, the color light signal passed by the color filter 103 may be interfered with an infrared light signal, thereby affecting the detection accuracy of the ambient light sensor 100 to the color light signal in the ambient light, which further affects the detection accuracy of the ambient light sensor 100.

In view of this, the present application provides an ambient light sensor, which may detect a signal amount of the infrared light signal in the ambient light. A detection result of the ambient light sensor may be corrected or optimized according to the signal amount of the infrared light signal, thereby improving the detection accuracy and detection performance of the ambient light sensor.

Figure 3:
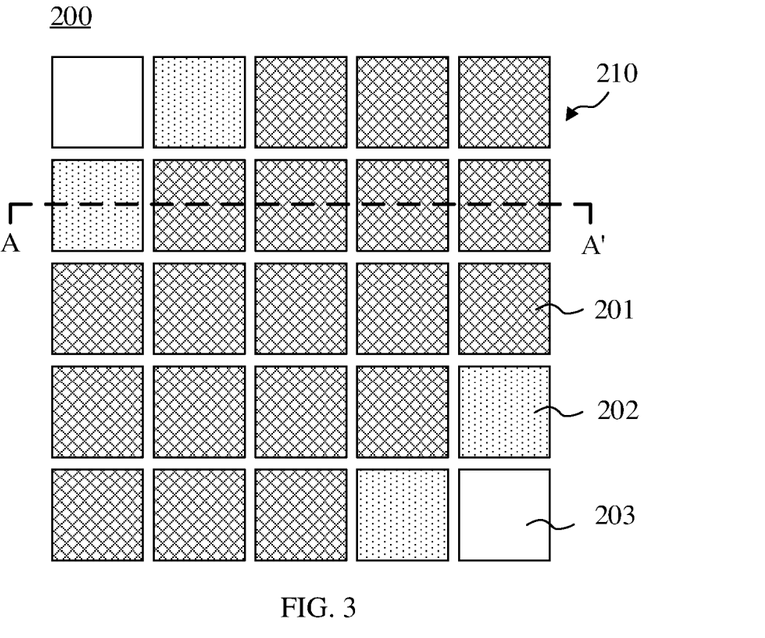
FIG. 3 is a schematic top view of an ambient light sensor provided by an embodiment of the present application.
Figure 4:
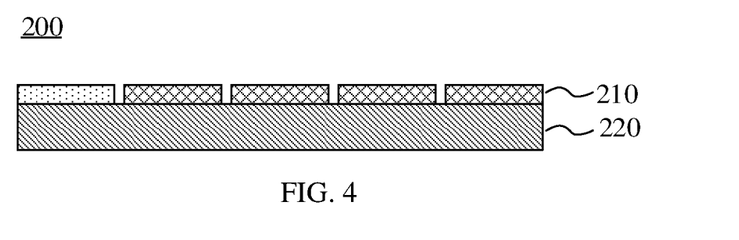
FIG. 4 is a cross-sectional schematic view of the ambient light sensor shown in FIG. 3 along an A-A' direction.

FIG. 3 shows a schematic top view of an ambient light sensor 200 provided by an embodiment of the present application, and FIG. 4 is a cross-sectional schematic view of the ambient light sensor 200 along an A-A' direction.

As shown in FIG. 3 and FIG. 4, in this embodiment of the present application, the ambient light sensor 200 includes:

a light filtering unit array 210 including a plurality of light filtering units, where the plurality of light filtering units include a color light filtering unit 201, a white light filtering unit 202 and a transparent light filtering unit 203, the white light filtering unit 202 is configured to pass a visible light signal and block an infrared light signal, and the transparent light filtering unit 203 is configured to pass the visible light signal and the infrared light signal;

a pixel unit array 220 located under the light filtering unit array 210, the pixel unit array 220 including a plurality of pixel units, and the plurality of pixel units being configured to receive a light signal after an ambient light passes through the plurality of light filtering units for an ambient light detection.

Specifically, in the embodiments of the present application, the ambient light sensor 200 includes: the pixel unit array 220 for sensing the light signal, and the pixel unit array 220 includes the plurality of pixel units for sensing the light signal. The pixel unit includes, but is not limited to, a photodiode (PD), a phototransistor, and other photosensitive devices.

Corresponding to the pixel unit array 220, the light filtering unit array 210 is provided on it. Optionally, in some implementation manners, the light filtering unit array 210 may be prepared on an upper surface of the pixel unit array 220 by a semiconductor preparation process, so that the light filtering unit 210 is provided on the pixel unit array 220.

For the light filtering unit array 210, it includes a plurality of light filtering units, and each light filtering unit may be used to pass a light signal of a target waveband to implement a light filtering function. Specifically, the light filtering unit may be a filter or a filter layer in the embodiments of the present application, and a preparation method thereof may refer to the relevant description in the related art. A structure and preparation method of the light filtering unit in the embodiments of the present application are not specifically limited.

In the embodiments of the present application, the plurality of light filtering units in the light filtering unit array 210 include: a color light filtering unit 201, a white light filtering unit 202 and a transparent light filtering unit 203. Specifically, the color light filtering unit 201 is used to pass color light signals of some wavebands in a visible light. Optionally, the light filtering unit array 210 may only include the color light filtering unit of one color, or the light filtering unit array 210 may also include the color light filtering unit of the plurality of colors. As an example but not a limitation, the color light filtering unit 201 includes, but is not limited to, a light filtering unit for three primary colors, that is, a light filtering unit for three colors of red, green, and blue (RGB), or may also be a light filtering unit for three complementary colors, that is, a light filtering unit for three colors of cyan, magenta and yellow (CMY), or a light filtering unit for one primary color and two complementary colors, or one complementary color and two primary colors.

In addition, in the embodiments of the present application, the white light filtering unit 202 may pass light signals of all visible light wavebands, that is, the white light filtering unit 202 may pass a white light. At the same time, the white light filtering unit 202 may absorb and/or reflect a light signal of an infrared waveband, so as to block the light signal of the infrared waveband from passing the white light filtering unit 202. Different from the white light filtering unit 202, the transparent light filtering unit 203 may not only pass the light signals of all visible light wavebands, but also pass the light signal of the infrared waveband.

Therefore, when the ambient light passes through the light filtering unit array 210, a pixel unit corresponding to the white light filtering unit 202 is used to detect a visible light signal in the ambient light, and a pixel unit corresponding to the transparent light filtering unit 203 is used to detect the visible light signal and infrared light signal in the ambient light. According to pixel values of pixel units corresponding to the white light filtering unit 202 and the transparent light filtering unit 203, the signal amount of the infrared light signal in the ambient light may be determined.

Optionally, in some embodiments, an infrared cut filter (IRCF) layer is provided in the white light filtering unit 202 to block the infrared light signal. However, an air layer or a transparent medium layer may be above the transparent light filtering unit 203, which is intended to pass the visible light signal and infrared light signal.

It should be noted that in the embodiments of the present application, the pixel unit corresponding to the light filtering unit refers to a pixel unit that may receive the light signal after passing the light filtering unit. For the convenience of description, in the present application, pixel units receiving the light signals after passing the same light filtering unit are simply referred to as pixel units corresponding to the light filtering unit.

Through the technical solution of the embodiments of the present application, the white light filtering unit 202 and the transparent light filtering unit 203 are provided in the ambient light sensor 200 at the same time, and according to the pixel units corresponding to the white light filtering unit 202 and the transparent light filtering unit 203, the signal amount of the infrared light signal in the ambient light may be detected and obtained. According to the signal amount of the infrared light signal, the detection result of the ambient light sensor 200 may be corrected or optimized, thereby improving the detection accuracy and detection performance of the ambient light sensor 200.

Optionally, in some implementation manners, a pixel unit corresponding to the white light filtering and a pixel unit corresponding to the transparent light filtering unit are configured to jointly detect the signal amount of the infrared light signal in the ambient light, and the signal amount of the infrared signal in the ambient light may be configured to determine a light source type corresponding to the ambient light.

Figure 5:
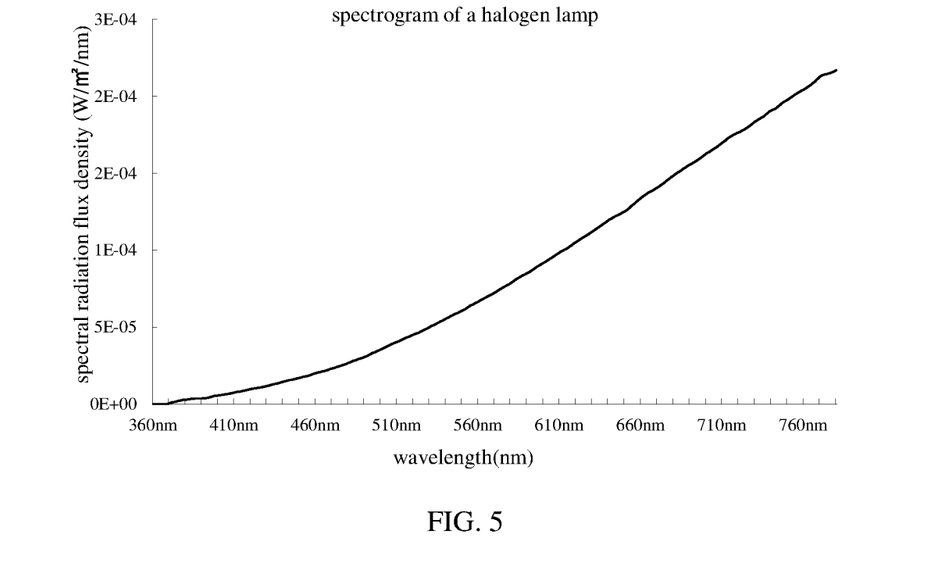
FIG. 5 is a spectrogram of a halogen lamp provided by an embodiment of the present application.

FIG. 5 shows a spectrogram of a halogen lamp provided by an embodiment of the present application.

As shown in FIG. 5, for a halogen lamp light source, the infrared light signal accounts for a large proportion of the light signals emitted thereof, while short wavelength light signals such as a blue light signal and a green light signal accounts for a small proportion. Through the technical solution of the embodiments of the present application, the white light filtering unit 202 and the transparent light filtering unit 203 are provided in the ambient light sensor 200, and according to pixel values of pixel units corresponding to the white light filtering unit 202 and the transparent light filtering unit 203, a proportion of the infrared light signal in the ambient light may be determined, so that it may be determined that the light sensor type corresponding to the current ambient light is the halogen lamp light source.

Based on the light source type corresponding to the ambient light, a processing unit of the ambient light sensor 200 may select an appropriate algorithm to process the pixel value generated by the pixel unit array 220 of the ambient light sensor 100 to obtain a relatively accurate ambient light detection result.

It should be understood that the proportion of the infrared light signal in the light signals of different types of light sources shall change to a certain extent. By detecting the signal amount of the infrared light signal in the ambient light, in addition that the light source type of the current ambient light may be determined as the halogen lamp light source shown in FIG. 5, it may also be other types of the light source. The embodiments of the present application do not limit specific types of the light source, which is intended to be able to distinguish by the signal amount of the infrared light signal.

Optionally, in addition to determining the light source type corresponding to the ambient light according to the signal amount of the infrared light signal in the ambient light, in some other implementation manners, the pixel unit corresponding to the white light filtering unit and the pixel unit corresponding to the transparent light filtering unit are configured to jointly detect the signal amount of the infrared light signal in the ambient light, and the signal amount of the infrared light signal may be configured to correct a pixel value of the pixel unit corresponding to the color light filtering unit 201, so as to correct a detection value of the color light signal in the ambient light, thereby improving the detection accuracy and detection performance of the ambient light sensor 200 to the color light signal in the ambient light.

Optionally, the color light filtering unit 201 includes one or more of the blue light filtering unit, the red light filtering unit and the green light filtering unit, the signal amount of the infrared light signal is configured to correct a pixel value of the pixel unit corresponding to one or more of the blue light filtering unit, the red light filtering unit and the green light filtering unit.

In some examples, a pixel value of the pixel unit corresponding to the color light filtering unit 201 may be configured to detect a color temperature of the ambient light. By correcting the pixel value of the pixel unit corresponding to the color light filtering unit 201 by the signal amount of the infrared light signal, a detection result of the color temperature of the ambient light may be further corrected, and the detection accuracy of the color temperature of the ambient light may be improved.

Figure 6:
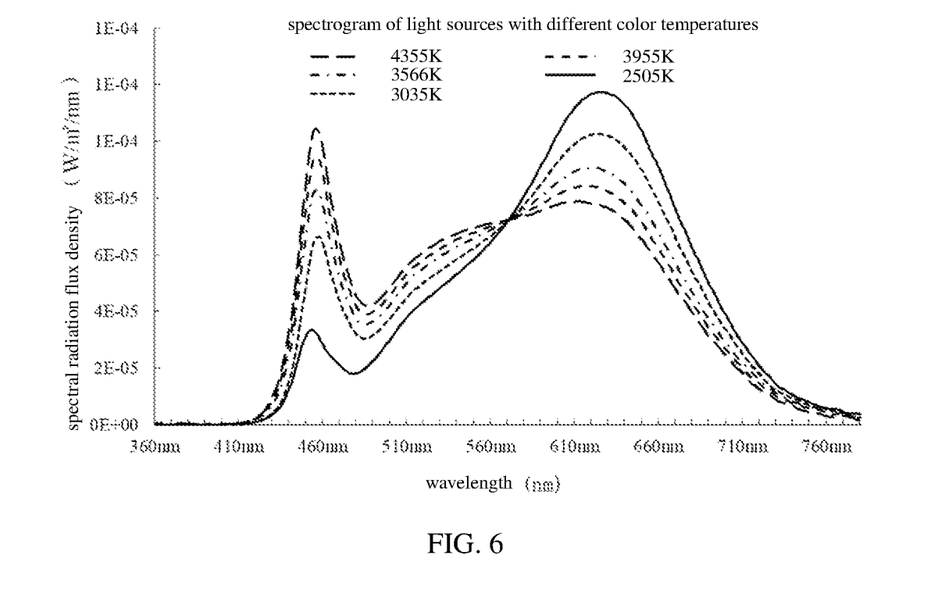
FIG. 6 is a spectrogram of a plurality of light sources with different color temperatures provided by an embodiment of the present application.

FIG. 6 shows a spectrogram of a plurality of light sources with different color temperatures provided by an embodiment of the present application.

As shown in FIG. 6, for the light sources with different color temperatures, the color temperature has a positive correlation with a ratio of a signal amount of the blue light signal to a signal amount of a red light signal in the light signal, that is, the greater the ratio of the signal amount of the blue light signal to the signal amount of the red light signal in a light source light signal, the higher the color temperature of the light source light signal.

Therefore, in the embodiments of the present application, in the light filtering unit array 210 of the ambient light sensor 200, the color light filtering unit 201 includes: the blue light filtering unit and the red light filtering unit, the blue light filtering unit and the red light filtering unit are mainly used to pass the blue light signal and the red light signal, respectively, but due to the limitation of the preparation process of the light filtering unit, the blue light filtering unit and the red light filtering unit, especially the red light filtering unit also pass part of the infrared light signal.

In view of this, the signal amount of the infrared light signal determined by the pixel values of the pixel units corresponding to the white light filtering unit 202 and the transparent light filtering unit 203 may be used to correct the pixel values of the pixel units corresponding to the blue light filtering unit and/or the red light filtering unit, and a ratio of the pixel values of the pixel units corresponding to the blue light filtering unit and the red light filtering unit is used to detect the color temperature of the ambient light.

As an exemplary correction method, a pixel value of the pixel unit corresponding to the red light filtering unit may be corrected by the following formula:

$$R'=R\times(1\times K\times\theta);$$

$$K=(W-C)/R;$$

where R' is the corrected pixel value of the pixel unit corresponding to the red light filtering unit, R is an original pixel value of the pixel unit corresponding to the red light filtering unit, W is an original pixel value of the pixel unit corresponding to the transparent light filtering unit 203, C is an original pixel value of the pixel unit corresponding to the white light filtering unit 202, and θ is a preset coefficient. (W−C) in the above formula may characterize the signal amount of an infrared light in an ambient light signal.

After the pixel value of the pixel unit corresponding to the red light filtering unit is corrected by the above formula, the color temperature of the ambient light, such as correlated color temperature (CCT), may be calculated by the following formula:

$$CCT=\alpha\times B/R';$$

where B is a pixel value of the pixel unit corresponding to the blue light filtering unit, and α is a preset coefficient.

It could be understood that, in addition to the correction method shown above, other correction methods may also be adopted to correct the pixel value of the pixel unit corresponding to the red light filtering unit or the pixel value of the pixel unit corresponding to the blue light filtering unit. The embodiments of the present application do not limit the specific correction methods.

Optionally, in order to further improve color temperature detection accuracy of the ambient light, in the light filtering unit array 210 of the ambient light sensor 200, a ratio of the number of the blue light filtering units to the number of the plurality of light filtering units, and a ratio of the number of the red light filtering units to the number of the plurality of light filtering units may be greater than a preset threshold value, so as to ensure the detection accuracy of the blue light signal and the red light signal by the ambient light sensor 200. As an example but not a limitation, the preset threshold value may be 15%, or any value above 15%.

Optionally, in addition that a pixel value of the pixel unit corresponding to the color light filtering unit 201 may be used to detect the color temperature of the ambient light, in some other examples, the pixel value of the pixel unit corresponding to the color light filtering unit 201 may also be used to detect an illuminance of the ambient light. Furthermore, by correcting the pixel value of the pixel unit corresponding to the color light filtering unit 201 by the signal amount of the infrared light signal, a detection result of the illuminance of the ambient light may be further corrected, thereby improving illuminance detection accuracy of the ambient light.

Specifically, three primary color (RGB) light signals in the ambient light stimulate three photoreceptor cells of the human eye, and three stimulation values of XYZ may be obtained, where a stimulation value Y may be used to characterize the illuminance of the ambient light. As an example but not a limitation, a transformation relationship between a RGB signal amount and XYZ stimulation values is shown in the following formula:

$$\begin{bmatrix}X\\Y\\Z\end{bmatrix}=\begin{bmatrix}0.4124 & 0.3576 & 0.1805\\0.2126 & 0.7152 & 0.0722\\0.0193 & 0.1192 & 0.9505\end{bmatrix}\begin{bmatrix}R\\G\\B\end{bmatrix}.$$

It can be seen from the above formula that an ambient light illuminance (the stimulation value Y) mainly depends on a signal amount of the green light signal in the ambient light. Therefore, the ambient light sensor 200 may be used to detect the signal amount of the green light signal in the ambient light to detect the illuminance of the ambient light.

Therefore, in the embodiments of the present application, in the light filtering unit array 210 of the ambient light sensor 200, the color light filtering unit 201 includes the green light filtering unit, the green light filtering unit is mainly used to pass the green light signal, but due to the limitation of the preparation process of the light filtering unit, the green light filtering unit may also pass part of the infrared light signal. Therefore, based on the above pixel values of the pixel units corresponding to the white light filtering unit 202 and the transparent light filtering unit 203, after determining the signal amount of the infrared light signal in the ambient light, a pixel value of the pixel unit corresponding to the green light filtering unit is corrected, and a relatively accurate signal amount of the green light signal in the ambient light may be obtained, thereby obtaining a relatively accurate illuminance detection result of the ambient light.

As an exemplary correction method, the pixel value of the pixel unit corresponding to the green light filtering unit may be corrected by the following formula:

$$G'=G-\beta\times(W-C);$$

where G' is the corrected pixel value of the pixel unit corresponding to the green light filtering unit, G is an original pixel value of the pixel unit corresponding to the green light filtering unit, W is an original pixel value of the pixel unit corresponding to the transparent light filtering unit 203, C is an original pixel value of the pixel unit corresponding to the white light filtering unit 202, and 13 is a preset coefficient. (W−C) in the above formula may characterize the signal amount of the infrared light in the ambient light signal.

After the pixel value of the pixel unit corresponding to the green light filtering unit is corrected by the above formula, the illuminance of the ambient light, may be calculated by the following formula:

$$ILL=k\times G';$$

where ILL is an illuminance of the ambient light, and k is a preset coefficient.

It could be understood that, in addition to the correction method shown above, other correction methods may also be used to correct the pixel value of the pixel unit corresponding to the green light filtering unit. The embodiments of the present application do not limit the specific correction methods.

Optionally, in order to further improve the illuminance detection accuracy of the ambient light, in the light filtering unit array 210 of the ambient light sensor 200, a ratio of the number of the green light filtering units to the number of the plurality of light filtering units may be greater than a preset threshold value, so as to ensure the detection accuracy of the green light signal by the ambient light sensor 200.

Through the description of the above embodiments of the present application, it can be seen that, with respect to the color light filtering unit 201, the white light filtering unit 202 and the transparent light filtering unit 203 play an auxiliary role. Therefore, in the above plurality of embodiments, the number of the color light filtering units 201 may be greater than or equal to the number of the white light filtering units 202, and/or the number of the color light filtering units 201 may be greater than the number of the transparent light filtering units 203. Optionally, in the color light filtering unit 201, the number of the light filtering units of any color may be greater than or equal to the number of the white light filtering units 202, and/or, greater than the number of the transparent light filtering units 203.

Through the technical solution of this implementation manner, on the basis of ensuring that the light filtering unit array 210 includes the white light filtering unit 202 and the transparent light filtering unit 203, a larger number of color light filtering units 201 are also provided in the light filtering unit array 210, which may greatly improve the detection accuracy of the color light signal in the ambient light, so as to improve the detection accuracy of optical parameters such as color temperature and illuminance of the ambient light, and improve performance of the ambient light sensor 200.

As an example, in the plurality of light filtering units of the light filtering unit array 210, a ratio of the number of the white light filtering units 202 to the number of the plurality of light filtering units is less than or equal to 20%.

As an example, in the plurality of light filtering units of the light filtering unit array 210, a ratio of the number of the transparent light filtering units 203 to the number of the plurality of light filtering units is less than or equal to 9%.

Optionally, in the plurality of light filtering units in the light filtering unit array 210, the number of the white light filtering units 202 and the transparent light filtering units 203 may also be greater than a certain threshold value, so as to ensure that there is a sufficient number of the white light filtering units 202 and the transparent light filtering units 203 in the light filtering unit array 210.

As an example, in the plurality of light filtering units of the light filtering unit array 210, a ratio of the number of the white light filtering units 202 to the number of the plurality of light filtering units is greater than or equal to 5%.

As an example, in the plurality of light filtering units of the light filtering unit array 210, a ratio of the number of the transparent light filtering units 203 to the number of the plurality of light filtering units is greater than or equal to 4%.

In addition, in the plurality of light filtering units of the light filtering unit array 210, the white light filtering unit 202 and the transparent light filtering unit 203 may be further provided in an edge area of the light filtering unit array 210, so as to ensure a collection effect of the pixel unit corresponding to the color light filtering unit 201 on the color light signal, thereby improving the detection accuracy and detection performance of the ambient light sensor 200.

In some implementation manners, the color light filtering unit 201 of the light filtering unit array 210 includes a red light filtering unit 2011 and a blue light filtering unit 2013 at the same time.

Optionally, as described above, pixel values of the red light filtering unit 2011 and the blue light filtering unit 2013 may be used to detect the color temperature of the ambient light.

Optionally, in the light filtering unit array 210, the number of the red light filtering units 2011 and the blue light filtering units 2013 may be greater than a certain threshold value to ensure a detection effect of the ambient light sensor 200 on the red light signal and the blue light signal, and furthermore, a detection effect of an ambient light color temperature may be guaranteed.

As an example, in the light filtering unit array 210, a ratio of the number of the blue light filtering units 2013 to the number of the plurality of light filtering units is greater than or equal to 24%; and/or, a ratio of the number of the red light filtering units 2011 to the number of the plurality of light filtering units is greater than or equal to 15%.

In some application scenarios, the ambient light sensor 200 is capable of being configured to be provided under a display screen 110 of an electronic device, and the ambient light sensor 200 is used to receive the ambient light after passing through the display screen 110 for the ambient light detection.

For example, as shown in FIG. 2, the ambient light sensor 200 is capable of being configured to be provided under the cover plate 140 and the display screen 110, and the display screen 110 includes a semiconductor circuit, an organic material, a polarizer, a polyimide (PI) film and other laminations, resulting in different transmittances of the light signals of different wavebands in the ambient light passing the display screen 110.

Figure 7:
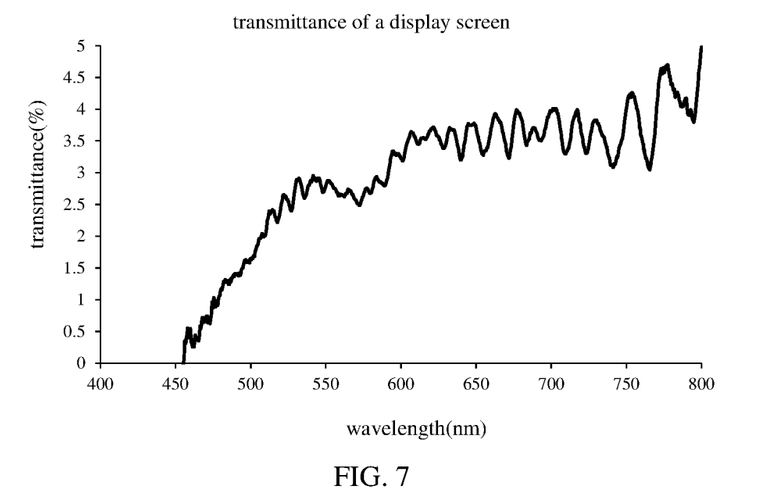
FIG. 7 is a schematic curve diagram of a transmittance of a display screen to light signals of different wavebands in an ambient light provided by an embodiment of the present application.

FIG. 7 shows a schematic curve diagram of a transmittance of a display screen 110 to light signals of different wavebands in an ambient light.

As shown in FIG. 7, the display screen 110 has a low transmittance for the blue light signal between 450 nm and 500 nm, and a high transmittance for the red light signal.

Therefore, when the ambient light sensor 200 is provided under the display screen 110, a proportion of the blue light filtering unit 2013 in the ambient light sensor 200 may be increased, so as to improve the detection effect of the ambient light sensor 200 on the blue light signal, thereby improving the detection accuracy of the ambient light color temperature by the ambient light sensor 200.

However, since the display screen 110 has a relatively high transmittance for the red light signal, in the ambient light sensor 200, a proportion of the red light filtering unit 2011 may be appropriately reduced, that is, the number of the red light filtering units 2011 may be less than or equal to the number of the blue light filtering units 2013.

Through the technical solution of the embodiments of the present application, in the light filtering unit array 210 of the ambient light sensor 200, the ratio of the number of the blue light filtering units to the number of the plurality of light filtering units is greater than or equal to 24%, which may ensure that the light filtering unit array 210 has a sufficient number of the blue light filtering units, which reduces an influence of the display screen 110 on the blue light signal and improves the detection performance of the ambient light sensor 200 on the blue light signal. Similarly, in the light filtering unit array 210 of the ambient light sensor 200, the ratio of the number of the red light filtering units to the number of the plurality of light filtering units is greater than or equal to 15%, and in the case of appropriately reducing the number of the red light filtering units 2011, it may ensure that the light filtering unit array 210 has a sufficient number of the red light filtering units 2011, thereby ensuring the detection performance of the ambient light sensor 200 for the red light signal.

In some other implementation manners, the color light filtering unit 201 of the light filtering unit array 210 may further include a green light filtering unit 2012.

Optionally, as described above, a pixel value of the green light filtering unit 2012 may be used to detect the illuminance of the ambient light.

Optionally, in the light filtering unit array 210, the number of the green light filtering units 2012 may be greater than a certain threshold value to ensure a detection effect of the ambient light sensor 200 on the green light signal, and furthermore, ensure a detection effect of the ambient light illuminance.

As an example, in the light filtering unit array 210, a ratio of the number of the green light filtering units 2012 to the number of the plurality of light filtering units is greater than or equal to 24%.

Figure 8:
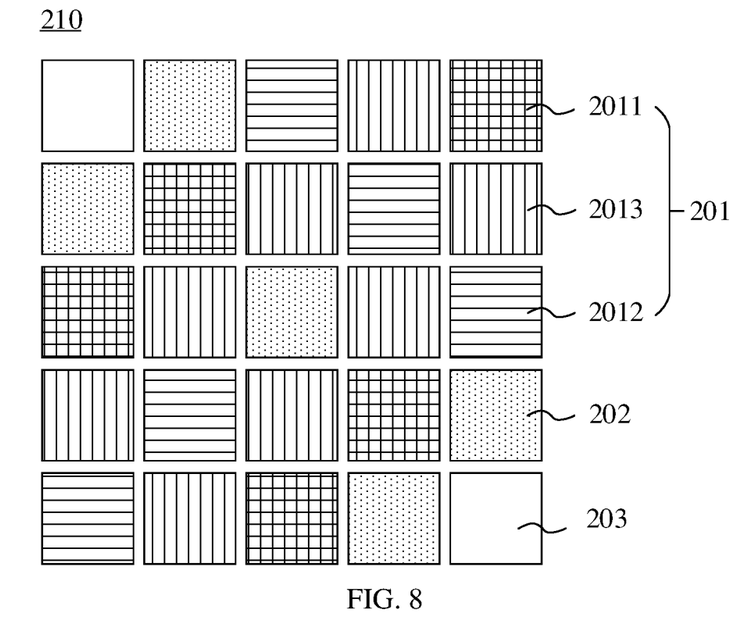
FIG. 8 is a schematic diagram of a light filtering unit array provided by an embodiment of the present application.
Figure 9:
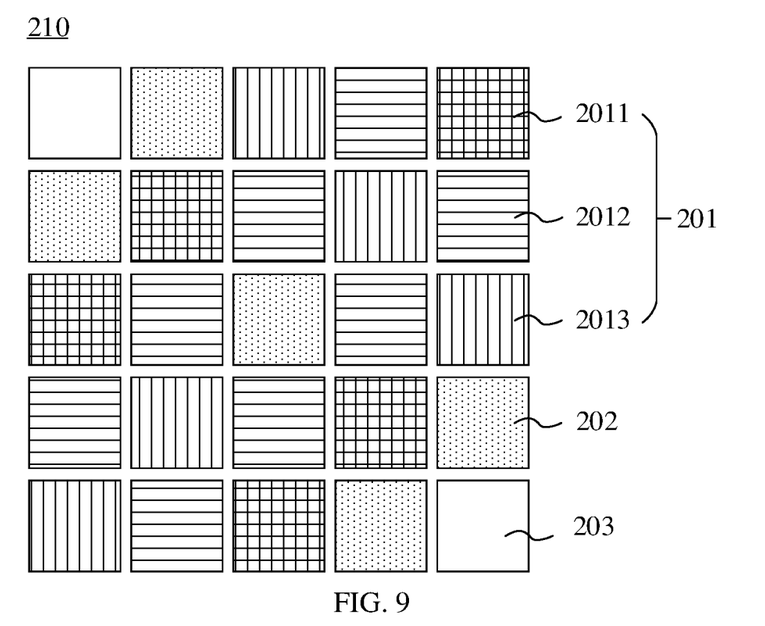
FIG. 9 is a schematic diagram of another light filtering unit array provided by an embodiment of the present application.
Figure 10:
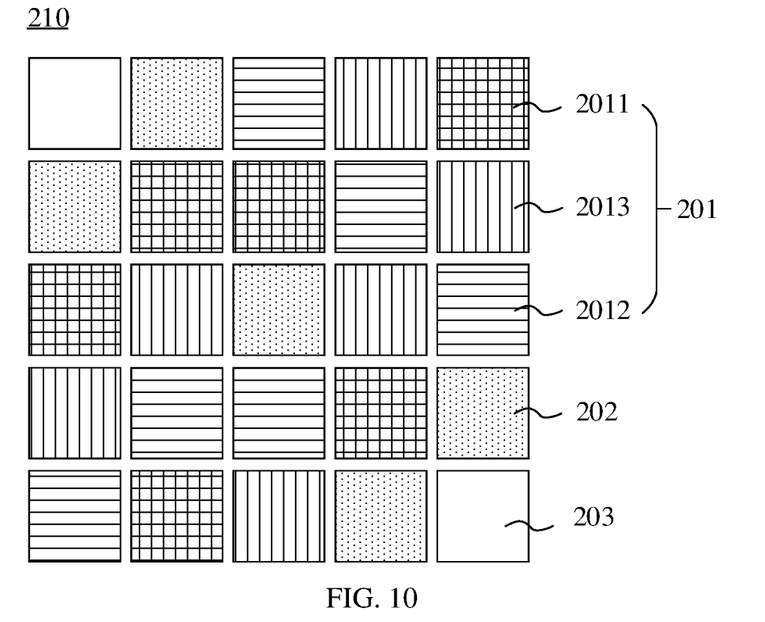
FIG. 10 is a schematic diagram of another light filtering unit array provided by an embodiment of the present application.

FIGS. 8 to 10 show schematic diagrams of several light filtering unit arrays 210 provided by the embodiments of the present application.

Specifically, a plurality of light filtering unit arrays in the light filtering unit array 210 are arranged in N row(s) and M column(s), where N and M are both positive integers. As an example, in the embodiments shown in FIGS. 8 to 10, N=M=5.

As shown in FIG. 8, in the light filtering unit array 210, the number of the red light filtering units 2011 is five, the number of the green light filtering units 2012 is five, and the number of the blue light filtering units 2013 is eight. Among them, a ratio of the number of the blue light filtering units 2011 to the number of all light filtering units is 32%. In this embodiment, a proportion of the blue light filtering unit 2013 is the largest, so the ambient light sensor 200 where the light filtering unit array 210 is located may be preferably applied under the display screen. And in this embodiment, the ambient light sensor 200 has a high accuracy for detecting the color temperature of the ambient light.

As shown in FIG. 9, in the light filtering unit array 210, the number of the red light filtering units 2011 is five, the number of the green light filtering units 2012 is eight, and the number of the blue light filtering units 2013 is five. Among them, a ratio of the number of the green light filtering units 2012 to the number of all light filtering units is 32%. And in this embodiment, a proportion of the green light filtering unit 2012 is the largest, the ambient light sensor 200 has a high accuracy for detecting the illuminance of the ambient light.

As shown in FIG. 10, in the light filtering unit array 210, the number of the red light filtering units 2011, the green light filtering units 2012, and the blue light filtering units 2013 is six. A ratio of the number of the red light filtering units 2011 to the number of all light filtering units, a ratio of the number of the green light filtering units 2012 to the number of all light filtering units, and a ratio of the number of the blue light filtering units 2013 to the number of all light filtering units are all 24%. And in this embodiment, the ambient light sensor 200 has a high accuracy for detecting the color temperature and the illuminance of the ambient light.

Optionally, in the above embodiments shown in FIGS. 8 to 10, the number of the white light filtering units 202 is five, which are distributed at an edge and a center of the light filtering unit array 210, respectively. The number of the transparent light filtering units 203 is two, which are distributed at two corners of the light filtering unit array 210, respectively.

Optionally, in the above embodiments shown in FIGS. 8 to 10, in the plurality of light filtering units of the light filtering unit array 210, the number of the transparent light filtering units 203 is the smallest, and the number of the white light filtering units 202 is less than or equal to the number of the color light filtering units 201 of any color, and in the color light filtering unit 201, the number of the green light filtering units 2012 or the blue light filtering units 2013 may be greater than or equal to the number of the red light filtering units 2011.

It could be understood that the above FIGS. 8 to 10 are merely examples, which show a schematic diagram of several light filtering unit arrays 210 provided by the embodiments of the present application. Under a condition that one or more preset ratios are satisfied, the present application may also provide more types of the light filtering unit arrays 210, which shall not be illustrated or discussed in detail here. Specifically, the light filtering unit array 210 may satisfy one or more of the following preset ratio conditions:

(1) a ratio of the number of the white light filtering units 202 to the number of the plurality of light filtering units is less than or equal to 20%;

(2) a ratio of the number of the white light filtering units 202 to the number of the plurality of light filtering units is greater than or equal to 5%;

(3) a ratio of the number of the transparent light filtering units 203 to the number of the plurality of light filtering units is less than or equal to 9%;

(4) a ratio of the number of the transparent light filtering units 203 to the number of the plurality of light filtering units is greater than or equal to 4%;

(5) a ratio of the number of the red light filtering units 2011 to the number of the plurality of light filtering units is greater than or equal to 15%;

(6) a ratio of the number of the green light filtering units 2012 to the number of the plurality of light filtering units is greater than or equal to 24%; and (7) a ratio of the number of the blue light filtering units 2013 to the number of the plurality of light filtering units is greater than or equal to 24%.

On the basis of satisfying one or more of the above proportional conditions, optionally, in the N row(s) of the light filtering units of the light filtering unit array 210, each row of the light filtering units includes: the red light filtering unit 2011, the green light filtering unit 2012, and the blue light filtering unit 2013. Therefore, in this implementation manner, the ambient light sensor 200 may uniformly sample the light signals of the plurality of colors, which may further improve the detection effect of the ambient light sensor 200 on the light signals of the plurality of colors, so as to improve the detection accuracy and the detection performance of the ambient light sensor 200.

Optionally, on the basis that each row of the light filtering units in the light filtering unit array 210 includes the red light filtering unit 2011, the green light filtering unit 2012 and the blue light filtering unit 2013, in the light filtering unit array 210, one or more rows of the light filtering units further include the white light filtering unit 202.

Optionally, in the light filtering unit array 210, each row of the light filtering units may further include: the white light filtering unit 202, so as to implement a uniform sampling on a white light signal by the ambient light sensor 200.

Optionally, each row of the light filtering units in the light filtering unit array 210 includes only one white light filtering unit 202. Through this implementation manner, while ensuring that the ambient light sensor 200 performs the uniform sampling on the white light signal, a large number of the white light filtering units may also be avoided, which affects the detection effect of the ambient light sensor 200 on the color light signal.

Optionally, on the basis of the above embodiments of the present application, in the M column(s) of the light filtering units of the light filtering unit array 210, each column of the light filtering units includes the red light filtering unit 2011, the green light filtering unit 2012, and the blue light filtering unit 2013. In other words, in the embodiments of the present application, each row and each column of the light filtering units in the light filtering unit array 210 both include: the red light filtering unit 2011, the green light filtering unit 2012 and the blue light filtering unit 2013.

Optionally, each column of the light filtering units may further include: the white light filtering unit 202. In other words, each row and each column of the light filtering units in the light filtering unit array 210 both include: the red light filtering unit 2011, the green light filtering unit 2012, the blue light filtering unit 2013 and the white light filtering unit 202.

Through the technical solution of this implementation manner, the ambient light sensor 200 may perform a more uniformly and comprehensively sampling on the light signals of the plurality of colors and the white light signal, thereby further improving the detection effect of the ambient light sensor 200 for the light signals of the plurality of colors and the white light signal, so as to improve the detection accuracy and detection performance of the ambient light sensor 200.

Figure 11:
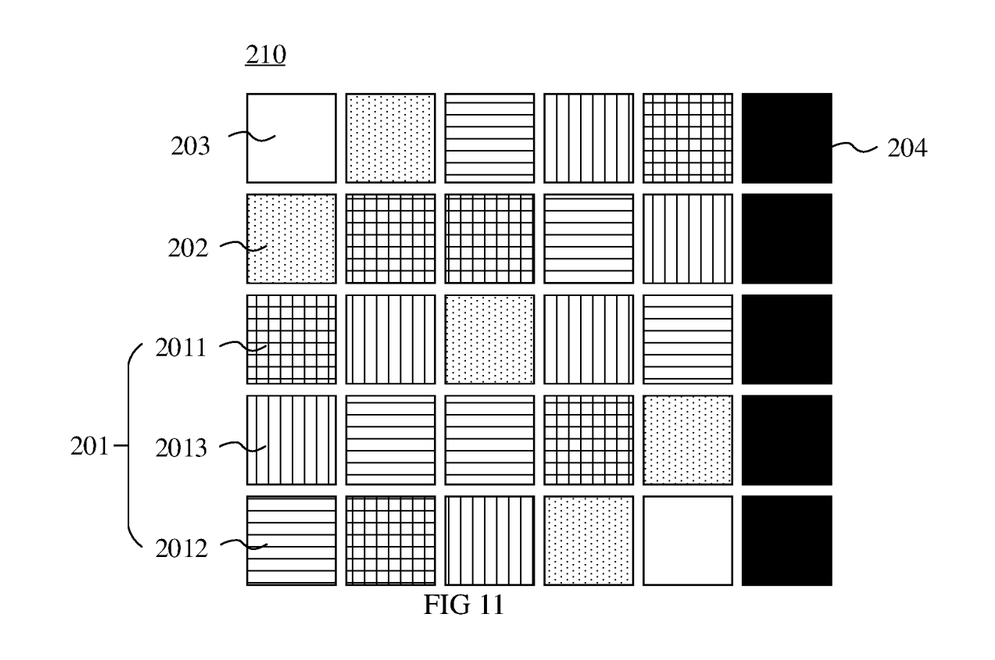
FIG. 11 is a schematic diagram of another light filtering unit array provided by an embodiment of the present application.

FIG. 11 shows a schematic diagram of another light filtering unit array 210 according to the embodiments of the present application.

As shown in FIG. 11, in the embodiments of the present application, the light filtering unit array 210 further includes: a light blocking unit 204 configured to block and absorb the light signal. In addition, in the pixel unit array 220, a pixel unit corresponding to the light blocking unit is provided to detect a noise floor of the ambient light sensor 200.

Specifically, in the embodiments of the present application, in the ambient light sensor 200, the pixel unit array 220 thereof includes not only the plurality of pixel units for sensing the light signal, but also other necessary related devices and metal connections to form a detection circuit. When the pixel unit does not receive the light signal, due to an influence of various factors such as ambient temperature and operating time, a current signal (also called a dark current) may also be formed inside the detection circuit. When the pixel unit receives the light signal, the current signal may form the noise floor of the ambient light sensor 200, which interferes and affects a final detection result of the ambient light sensor 200.

In view of this, in the light filtering unit array 210 of the ambient sensor 200, in addition to the light filtering unit, a light blocking unit 204 is also provided, and the light blocking unit 204 may also be regarded as a black light filtering unit for absorbing and blocking all visible light signals and the infrared light signals or the like in the ambient light. When a pixel unit corresponding to the light filtering unit in the pixel unit array 220 receives the light signal for the ambient light detection, a pixel unit corresponding to the light blocking unit 204 in the pixel unit array 220 does not receive the light signal to detect the noise floor of the current ambient light sensor 200. Through this implementation manner, the pixel unit corresponding to the light blocking unit 204 is used to detect the noise floor of the current ambient light sensor 200, the detection of the noise floor has a high accuracy, and the noise floor may be used to correct a pixel value of the pixel unit corresponding to the light filtering unit in the pixel unit array 220, so as to further improve the detection accuracy and detection performance of the ambient light sensor 200.

Optionally, as shown in FIG. 11, a dimension of the light blocking unit 204 is the same as that of the light filtering unit. Through this implementation manner, it may be convenient for the light blocking unit 204 to be manufactured together with the light filtering unit, and it may also be convenient to correct the pixel value of the pixel unit corresponding to the light filtering unit by using the pixel value of the pixel unit corresponding to the light blocking unit 204.

Optionally, as shown in FIG. 11, in the light filtering unit array 210, one light blocking unit 204 is provided at an end portion of each row of the light filtering units in the N row(s) of the light filtering units. Alternatively, in other implementation manners, one light blocking unit 204 may also be provided at an end portion of each column of the light filtering units in the M column(s) of the light filtering units. Through this implementation manner, the light blocking unit 204 may be uniformly provided on an edge of the light filtering unit array 210, without affecting a detection of the light signal by the pixel unit corresponding to the light filtering unit, and the pixel unit corresponding to each row of the light filtering units or each column of the light filtering units provides noise floor information, so as to accurately correct a pixel value of the pixel unit corresponding to each row of the light filtering units or each column of the light filtering units, thereby improving a signal-to-noise ratio of the ambient light sensor 200.

Optionally, referring to the light filtering unit array 210 shown in FIGS. 3 to 4 and FIGS. 8 to 11, a gap is formed between two adjacent light filtering units, and a width of the gap may be greater than 20 μm. Specifically, the two adjacent light filtering units are two adjacent light filtering units in a row direction or two adjacent light filtering units in a column direction. Optionally, in some implementation manners, the gap may correspond to three or more pixel units.

Through this implementation manner, the gap is designed between the two adjacent light filtering units, and in the case of fluctuations in the preparation process of the light filtering unit, it may ensure that the two adjacent light filtering units shall not overlap, and ensure a quality of the light signal collected by the ambient light sensor 200 to ensure the detection effect of the ambient light sensor 200. In addition, a phenomenon of a light signal crosstalk shall occur between the two adjacent light filtering units, and the closer the distance between the two adjacent light filtering units, the greater the degree of the crosstalk. Therefore, the gap of a certain width is designed between the two adjacent light filtering units, which may reduce a crosstalk phenomenon between the two adjacent light filtering units, thereby further ensuring the quality of the light signal collected by the ambient light sensor 200 to ensure the detection effect of the ambient light sensor 200.

Optionally, in some implementation manners, an area of each light filtering unit may be larger than 36 μm×36 μm, so as to ensure light filtering performance of each light filtering unit and reduce the crosstalk phenomenon between the two adjacent light filtering units. Optionally, each light filtering unit may correspond to the plurality of pixel units in the pixel unit array 220. For example, each light filtering unit corresponds to P×P pixel units in the pixel unit array 220, and where P is a positive integer greater than or equal to 5.

The embodiments of the present application further provide an electronic device, which may include the ambient light sensor 200 and the display screen 110 of any one of the above embodiments of the present application.

Optionally, the ambient light sensor 200 may be provided in a first area 101 or a second area 102 in an electronic device 10 shown in FIG. 1.

Optionally, when the ambient light sensor 200 is provided in the second area 102, that is, is provided under a display area of the display screen 110, an arrangement method thereof may refer to the relevant description of the embodiment shown in FIG. 2.

Specifically, the ambient light sensor 200 is provided in the electronic device, and sensing data detected by the ambient light sensor 200 may be used to adjust optical parameters of the display screen 110. For example, the color temperature of the ambient light detected by the ambient light sensor 200 may be used to adjust the color temperature of the display screen 110, and the illuminance of the ambient light detected by the ambient light sensor 200 may be used to adjust a brightness of the display screen 110. Through the technical solution of the embodiments of the present application, it is possible to implement a more comprehensive adjustment of the display screen 110 for the ambient light, so as to improve a user's experience of using the electronic device.

In addition, since the ambient light sensor 200 provided in the embodiments of the present application has the high detection accuracy and detection performance, providing the ambient light sensor 200 in the electronic device may enable the adjustment of the display screen 110 more accurate to adapt to the current ambient light, so as to further improve the user's experience of using the electronic device.

It should be understood that specific examples in the present application are just for helping those skilled in the art better understand the embodiments of the present application, rather than for limiting the scope of the embodiments of the present application.

It should also be understood that various implementation manners described in the present application may be implemented individually or in combination, which are not limited by the embodiments of the present application.

For the convenience of description, in the embodiments of the present application, same components are denoted by same reference numerals, and detailed description of the same components is omitted in different embodiments for brevity. It should be understood that dimensions such as thicknesses, lengths and widths of various components in the embodiments of the present application shown in the figures, as well as dimensions of the overall thickness, length and width of an integrated apparatus are merely illustrative, and should not constitute any limitation to the present application.

Unless otherwise illustrated, all technical and scientific terms used in the embodiments of the present application have the same meaning as commonly understood by those skilled in the technical art to which the present application pertains. Terms used in the present application are merely for the purpose of describing specific embodiments, and are not intended to limit the scope of the present application. The terms "comprising" and "having" and any variations thereof in the specification and the claims of the present application as well as the foregoing description of the accompanying figures are intended to cover non-exclusive inclusions.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the present application, the term "and/or" is only an association relation describing associated objects, which means that there may be three relations. For example, A and/or B may represent three situations: A exists, both A and B exist, and B exists. In addition, the character "/" in the present application generally indicates that the associated objects before and after the character are in an "or" relationship.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. An ambient light sensor, comprising:
 a light filtering unit array comprising a plurality of light filtering units, the plurality of light filtering units comprising a color light filtering unit, a white light filtering unit and a transparent light filtering unit, the white light filtering unit being configured to pass a visible light signal and block an infrared light signal, and the transparent light filtering unit being configured to pass the visible light signal and the infrared light signal;
 a pixel unit array located under the light filtering unit array, the pixel unit array comprising a plurality of pixel units, and the plurality of pixel units being configured to receive a light signal after an ambient light passes through the plurality of light filtering units for an ambient light detection;

wherein a pixel unit corresponding to the white light filtering unit is configured to detect the visible light signal in ambient light, a pixel unit corresponding to the transparent light filtering unit is configured to detect the visible light signal and the infrared light signal in the ambient light, the pixel unit corresponding to the white light filtering unit and the pixel unit corresponding to the transparent light filtering unit are configured to jointly detect a signal amount of the infrared light signal in the ambient light, and the signal amount of the infrared light signal is configured to correct a pixel value of a pixel unit corresponding to the color light filtering unit.

2. The ambient light sensor according to claim 1, wherein in the plurality of light filtering units, the number of color light filtering units is greater than or equal to the number of white light filtering units, and/or, the number of color light filtering units is greater than the number of transparent light filtering units.

3. The ambient light sensor according to claim 1, wherein in the plurality of light filtering units, a ratio of the number of white light filtering units to the number of the plurality of light filtering units is less than or equal to 20%, and/or, a ratio of the number of white light filtering units to the number of the plurality of light filtering units is greater than or equal to 5%.

4. The ambient light sensor according to claim 1, wherein in the plurality of light filtering units, a ratio of the number of transparent light filtering units to the number of the plurality of light filtering units is less than or equal to 9%, and/or, a ratio of the number of transparent light filtering units to the number of the plurality of light filtering units is greater than or equal to 4%.

5. The ambient light sensor according to claim 1, wherein the white light filtering unit and/or the transparent light filtering unit are located in an edge area of the light filtering unit array.

6. The ambient light sensor according to claim 1, wherein in the plurality of light filtering units, the color light filtering unit comprises: blue light filtering units and red light filtering units; and
a ratio of the number of blue light filtering units to the number of the plurality of light filtering units is less than or equal to 24%, and/or, a ratio of the number of red light filtering units to the number of the plurality of light filtering units is greater than or equal to 15%.

7. The ambient light sensor according to claim 6, wherein a ratio of pixel values of pixel units corresponding to the blue light filtering unit and the red light filtering unit is configured to detect color temperature of the ambient light.

8. The ambient light sensor according to claim 1, wherein in the plurality of light filtering units, the color light filtering unit comprises: green light filtering units, and a ratio of the number of green light filtering units to the number of the plurality of light filtering units is greater than or equal to 24%;
wherein a pixel value of a pixel unit corresponding to the green light filtering unit is configured to detect illuminance of the ambient light.

9. The ambient light sensor according to claim 1, wherein the plurality of light filtering units are arranged in N row(s), and each row of the light filtering units of the N row(s) of the light filtering units comprises: a red light filtering unit, a green light filtering unit and a blue light filtering unit, and wherein N is a positive integer.

10. The ambient light sensor according to claim 9, wherein each row of the light filtering units of the N row(s) of the light filtering units further comprises the white light filtering unit.

11. The ambient light sensor according to claim 9, wherein the plurality of light filtering units are arranged in M column(s), and each column of the light filtering units of the M column(s) of the light filtering units comprises: the red light filtering unit, the green light filtering unit and the blue light filtering unit, and wherein M is a positive integer.

12. The ambient light sensor according to claim 11, wherein each column of the light filtering units of the M column(s) of the light filtering units further comprises the white light filtering unit.

13. The ambient light sensor according to claim 1, wherein the light filtering unit array further comprises: a light blocking unit configured to block and absorb a light signal; and
a pixel unit in the pixel unit array corresponding to the light blocking unit being configured to detect a noise floor of the ambient light sensor;
wherein the plurality of light filtering units are arranged in the N row(s), an end portion of each row in the N row(s) of the light filtering units is provided with one light blocking unit, and wherein N is a positive integer.

14. The ambient light sensor according to claim 1, wherein a gap is formed between two adjacent light filtering units in the light filtering unit array, and a width of the gap is greater than 20 μm.

15. The ambient light sensor according to claim 1, wherein in the light filtering unit array, each light filtering unit corresponds to P×P pixel units in the pixel unit array, and wherein P is a positive integer greater than or equal to 5.

16. The ambient light sensor according to claim 1, wherein the color light filtering unit comprises one or more of a blue light filtering unit, a red light filtering unit and a green light filtering unit, the signal amount of the infrared light signal is configured to correct a pixel value of a pixel unit corresponding to one or more of the blue light filtering unit, the red light filtering unit and the green light filtering unit.

17. The ambient light sensor according to claim 1, wherein a pixel unit corresponding to the white light filtering and a pixel unit corresponding to the transparent light filtering unit are configured to jointly detect the signal amount of the infrared light signal in the ambient light, and the signal amount of the infrared signal is configured to determine a light source type corresponding to the ambient light.

18. The ambient light sensor according to claim 1, wherein the ambient light sensor is capable of being configured to be provided under a display screen of an electronic device, and the ambient light sensor is configured to receive the ambient light after passing through the display screen for the ambient light detection.

19. An electronic device, comprising: a display screen and an ambient light sensor, comprising:
a light filtering unit array comprising a plurality of light filtering units, the plurality of light filtering units comprising a color light filtering unit, a white light filtering unit and a transparent light filtering unit, the white light filtering unit being configured to pass a visible light signal and block an infrared light signal, and the transparent light filtering unit being configured to pass the visible light signal and the infrared light signal;

a pixel unit array located under the light filtering unit array, the pixel unit array comprising a plurality of pixel units, and the plurality of pixel units being configured to receive a light signal after an ambient light passes through the plurality of light filtering units for an ambient light detection;

wherein sensing data detected by the ambient light sensor is configured to adjust an optical parameter of the display screen, and the ambient light sensor is provided under a display area of the display screen;

wherein a pixel unit corresponding to the white light filtering unit is configured to detect the visible light signal in ambient light, a pixel unit corresponding to the transparent light filtering unit is configured to detect the visible light signal and the infrared light signal in the ambient light, the pixel unit corresponding to the white light filtering unit and the pixel unit corresponding to the transparent light filtering unit are configured to jointly detect a signal amount of the infrared light signal in the ambient light, and the signal amount of the infrared light signal is configured to correct a pixel value of a pixel unit corresponding to the color light filtering unit.

* * * * *